United States Patent [19]

Pullola

[11] Patent Number: 4,655,169
[45] Date of Patent: Apr. 7, 1987

[54] TANK FOR GROWING FISH

[76] Inventor: Arvo Pullola, Bålbäcken, 682 00 Filipstad, Sweden

[21] Appl. No.: 833,645

[22] Filed: Feb. 25, 1986

[30] Foreign Application Priority Data

Feb. 27, 1985 [SE] Sweden ............................. 8500975

[51] Int. Cl.$^4$ ............................................. A01K 63/00
[52] U.S. Cl. ......................................................... 119/3
[58] Field of Search ......................................... 119/3, 5

[56] References Cited

U.S. PATENT DOCUMENTS

| | | | |
|---|---|---|---|
| 1,528,179 | 3/1925 | Baldridge | 119/3 |
| 3,116,712 | 1/1964 | Ogden et al. | 119/3 |
| 4,211,183 | 7/1980 | Hoult | 119/3 |

Primary Examiner—Hugh R. Chamblee
Attorney, Agent, or Firm—Flynn, Thiel, Boutell & Tanis

[57] ABSTRACT

According to the invention there is proposed an arrangement in tanks for growing living fish. Each tank (20) is per se of conventional embodiment, with a peripheral inlet and a central outlet for water. According to the invention, one or more spiral grooves (26) are arranged along the bottom of the tank, said grooves extending from a point close to the periphery of the tank and in a spiral path towards the center of the tank to a sludge funnel (18) situated there. Water circulates in the tank (20), and a sludge sinking into the groove (26) or grooves is urged by the circulating water towards the funnel more quickly than if it had accompanied the water in its movement towards the outlet. The spiral groove (26) or grooves may be formed directly in the bottom of the tank (20), thereby causing great stiffness in it, or they may be formed in a separate means, which is placed on the bottom of the tank.

6 Claims, 9 Drawing Figures

Fig. 7
Fig. 8
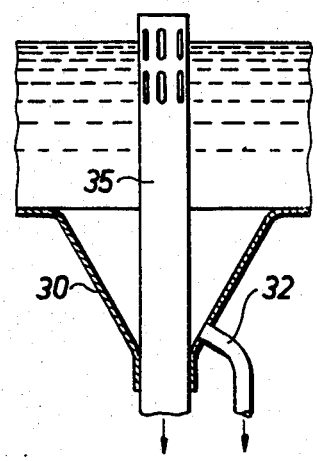
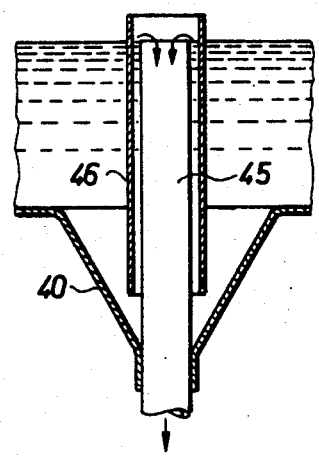
Fig. 9
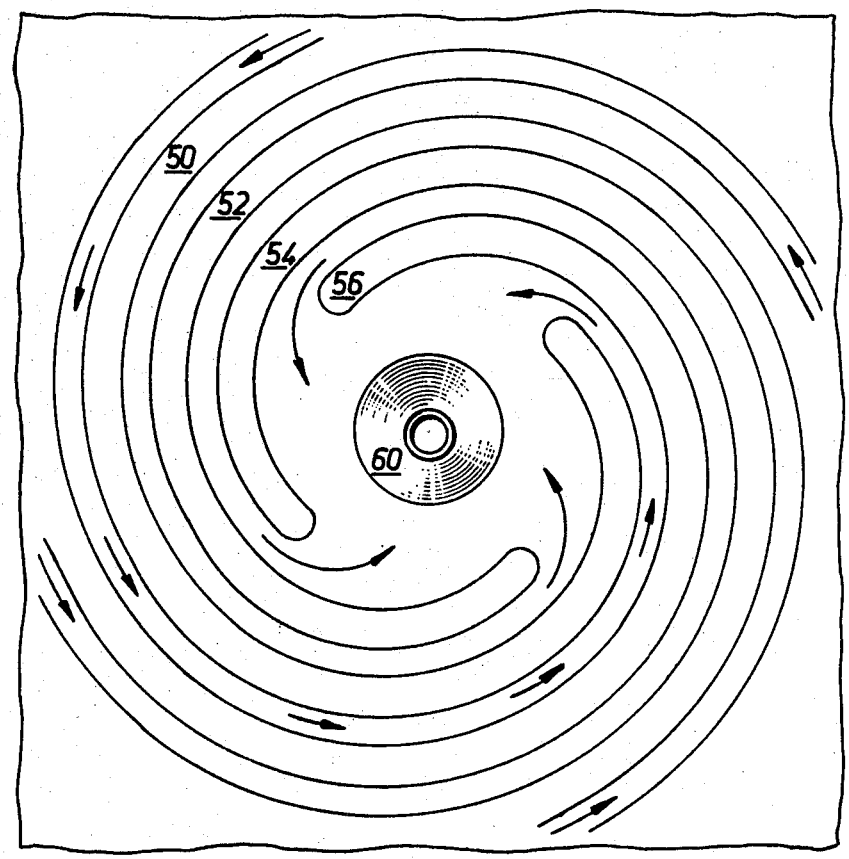

TANK FOR GROWING FISH

The present invention relates to pisciculture, or more specifically to the type of culture involving the growing of fish in a large number of separate tanks, which together form the pisciculture plant. The invention is thus not applicable to the type of pisciculture carried on in open-air basins, small lakes, secluded coastal inlets etc.

Fish cultivation in separate tanks has been found to have considerable advantages in different respects. The cultivation process may be carefully controlled in its entirety, and important parameters such as temperature, water throughput etc may be regulated optimally. Furthermore, cultivation may be carried out indoors, where space can be well utilised by the cultivation tanks being arranged side-by-side and in tiers, with each separate tank accessible for inspection.

The water in the tank is renewed by fresh water being introduced tangentially at a point along the periphery of the tank and being allowed to circulate slowly towards a centrally situated outlet. From half to the whole of the water in the tank is replaced every hour, and the water level is kept constant in the tank. The tanks are generally open and may have a circular cross-sectional shape, which is the most favorable from the flow aspect, but due to reasons of space the tanks are most often formed square, with rounded corners, without the flow pattern being noticeably disturbed. Contaminants and dirt particles sink to the bottom to form a bottom sludge, which accompanies the circulating movement of the water while slowly moving towards the centre, where it is tapped off.

Pisciculture plant constructed according to this principle, i.e. made up from separate tanks, has been found to function excellently, but the known tanks used in such plants have been found nevertheless to have certain drawbacks, mainly two. In the first place there are certain strength problems, or rather elasticity problems, with the tanks used at present. In most cases these are conventionally made from glass fibre-reinforced plastics, and the tanks are both strong and light. However, since the comparatively wide tanks must contain a large volume of water, their bottoms must be well supported, in other words they must stand on a proper floor. It would be a great advantage if the tanks could be arranged in tiers in a simple lattice frame or beam system so that they could be stacked one above the other in a space-saving manner. The tanks used at present can not be placed on two beams arranged parallel, for example, without the water in the tank causing elastic deformation in it, which is troublesome to a great degree, particularly with regard to connecting the tank to fixed systems, where such elastic deformation can cause serious problems, and even the risk of rupture.

The second drawback concerns the dirt and contaminants which gradually collect in the water and which form the mentioned bottom sludge. As mentioned, this only moves slowly towards a centrally placed outlet for tapping off, and it would be a great advantage if the residence time of the sludge in the tank could be considerably reduced, particularly since the radial movement of the sludge particles towards the centre for tapping off, caused by the slow circulation of the water, does not always correspond to new production of contaminants, which thus collect on the bottom and increase the amount of sludge. The necessary flushing then means a loss of water.

The invention thus has the object of providing a new type of tank for pisciculture, in which the mentioned drawbacks are overcome, i.e. a tank which has the bottom stiffness required for being placed on a pair of beams in a shelf or storage system constructed to include such beams, the tank also being arranged so that the contaminants and dirt particles formed therein are quickly conveyed to the central outlet without any special flushing devices or the like being needed.

The objects are achieved, and the drawbacks with earlier pisciculture tanks are overcome by the inventive tank having been given the characterising features disclosed in claim 1.

The invention will now be described for the purpose of exemplification and with reference to the accompanying drawings, on which FIGS. 1 and 2 schematically illustrate how a pisciculture tank of known type is constructed, FIG. 1 being a cross section along the line I—I in FIG. 2.

FIGS. 7 and 8 schematically illustrate a central portion of the tank and show two different ways of removing the sludge, which is led in accordance with the invention to the centre of the tank.

Finally, FIG. 9 illustrates the flow pattern for the bottom sludge in an alternative bottom configuration in accordance with the invention.

Figure 1:
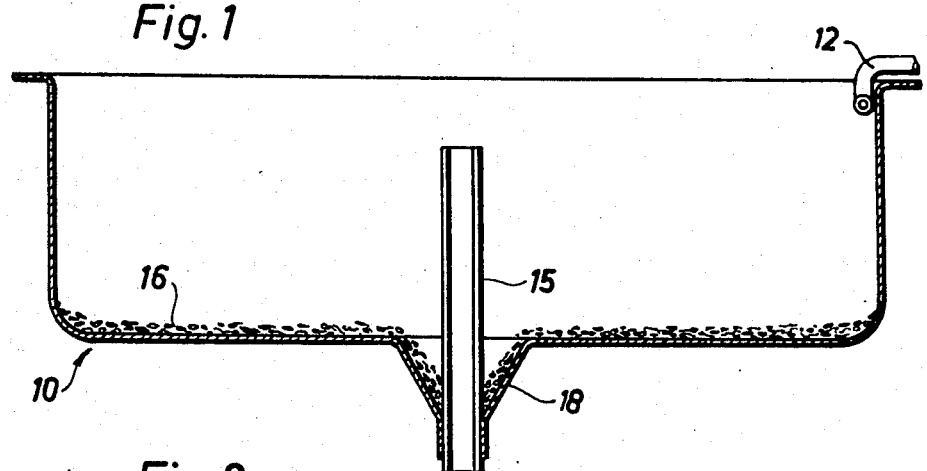
Figure 2:
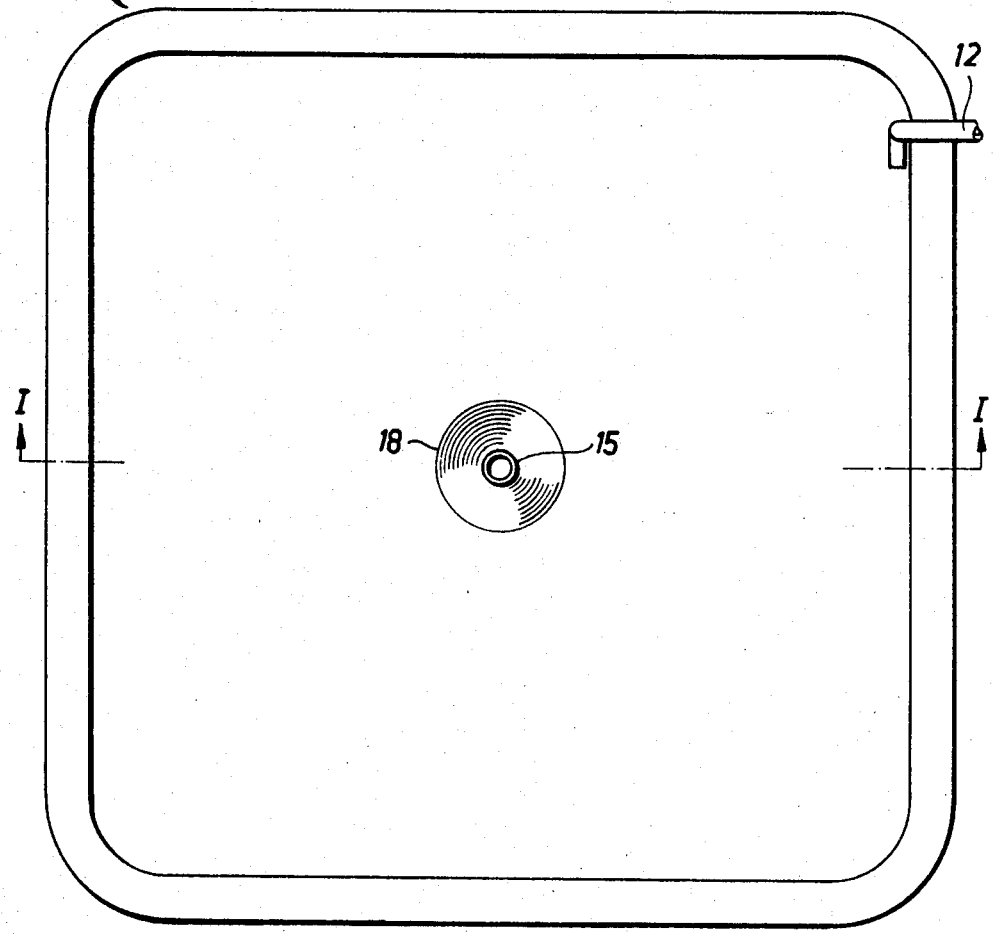

The conventional tank illustrated in FIGS. 1 and 2 has in horizontal cross section a substantially square shape, with rounded corners. It is supplied with fresh water via an inlet 12 disposed in one corner of it and directed tangentially along its wall. The water in the tank will thus circulate slowly, moving towards the centre of the tank, where an overflow 15 in the shape of an upstanding pipe is disposed, whereby the water level in the tank is kept constant. During the slow movement of the water, dirt particles and contaminants will sink to the bottom of the tank, where they form a sludge, as indicated at 16. This sludge rotates slowly with the water and moves simultaneously in towards the centre, where the tank is formed with a conical depression 18, in the centre of which the overflow pipe 15 is disposed. When sludge particles arrive at the centre of the tank they will thus be collected in the conical depression 18, from where they are removed, as will be described.

As already mentioned in the introduction, the rather wide flat bottom of the tank means that it must be supported over the whole of its area by a flat carrying floor. Furthermore, the slow movement of the sludge towards the centre results in that sludge removal here does not keep pace with new formation of sludge, and the sludge layer over the bottom of the tank tends to grow.

Figure 3:
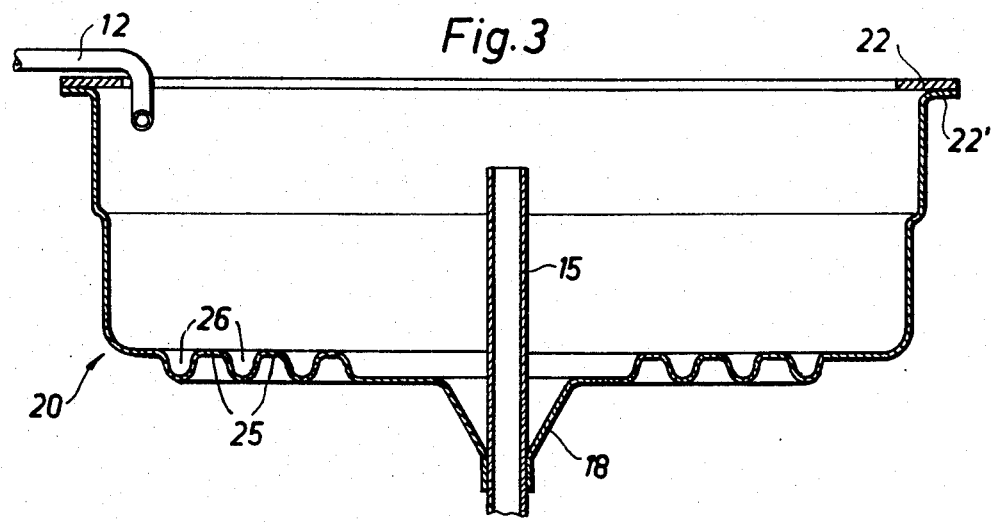
FIGS. 3 and 4 are schematic views respectively corresponding to FIGS. 1 and 2, but showing a pisciculture tank in accordance with the invention.
Figure 4:
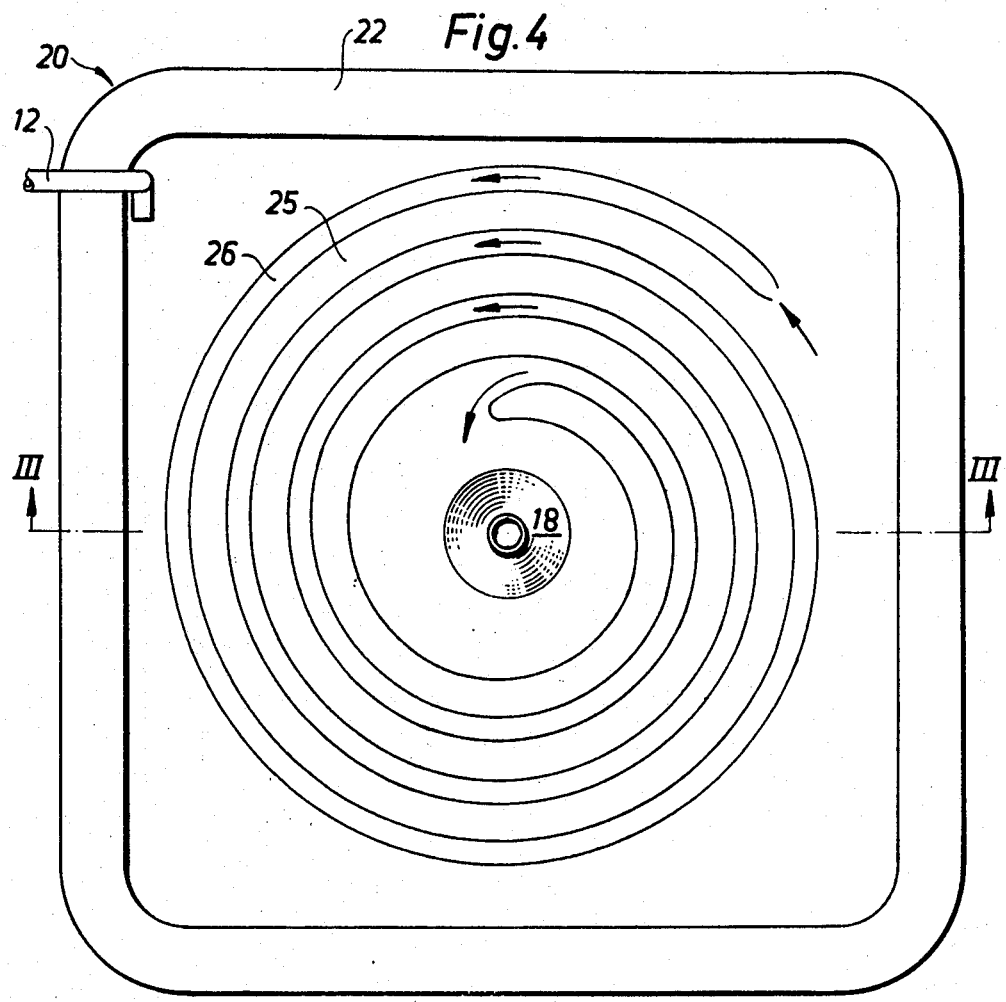

In FIGS. 3 and 4 there is illustrated the implementation in accordance with the invention of the pisciculture tank 20, this tank corresponding in size and shape to the conventional tank in FIGS. 1 and 2. However, according to the invention, the bottom thereof has been reinforced by strong ribs or "corrugations" 25, extending over the bottom around the centre of the tank to form a strong reinforcement of the bottom, to such a high degree that a tank full of water may be supported on a pair of parallel beams without the tank being subject to disturbing deformations. As further reinforcement and stiffening, the inventive tank 20 is provided with a wide edge flange 22, which contributes to a high degree in increasing the general stiffness of the tank, and its ability to withstand deformations. As will be seen, the flange 22 also extends a small distance in over the tank itself, which has a special effect, apart from increasing the stiffness of the edge without encroaching on the space outside the ordinary edge flange 22' of the tank, this effect namely being to prevent wriggling fish such as eels from getting over the edge of the tank.

Figure 5:
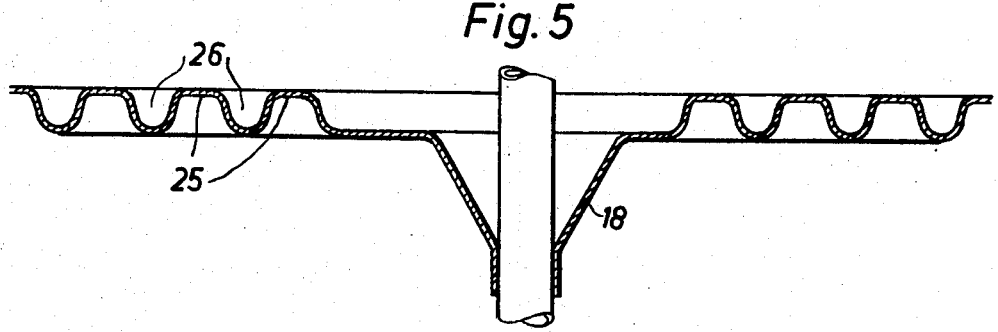
FIGS. 5 and 6 illustrate to a larger scale the embodiment of the corrugations or ribs arranged at the bottom of the tank in accordance with the invention, FIG. 5 being a cross section along the line V—V in FIG. 6.
Figure 6:
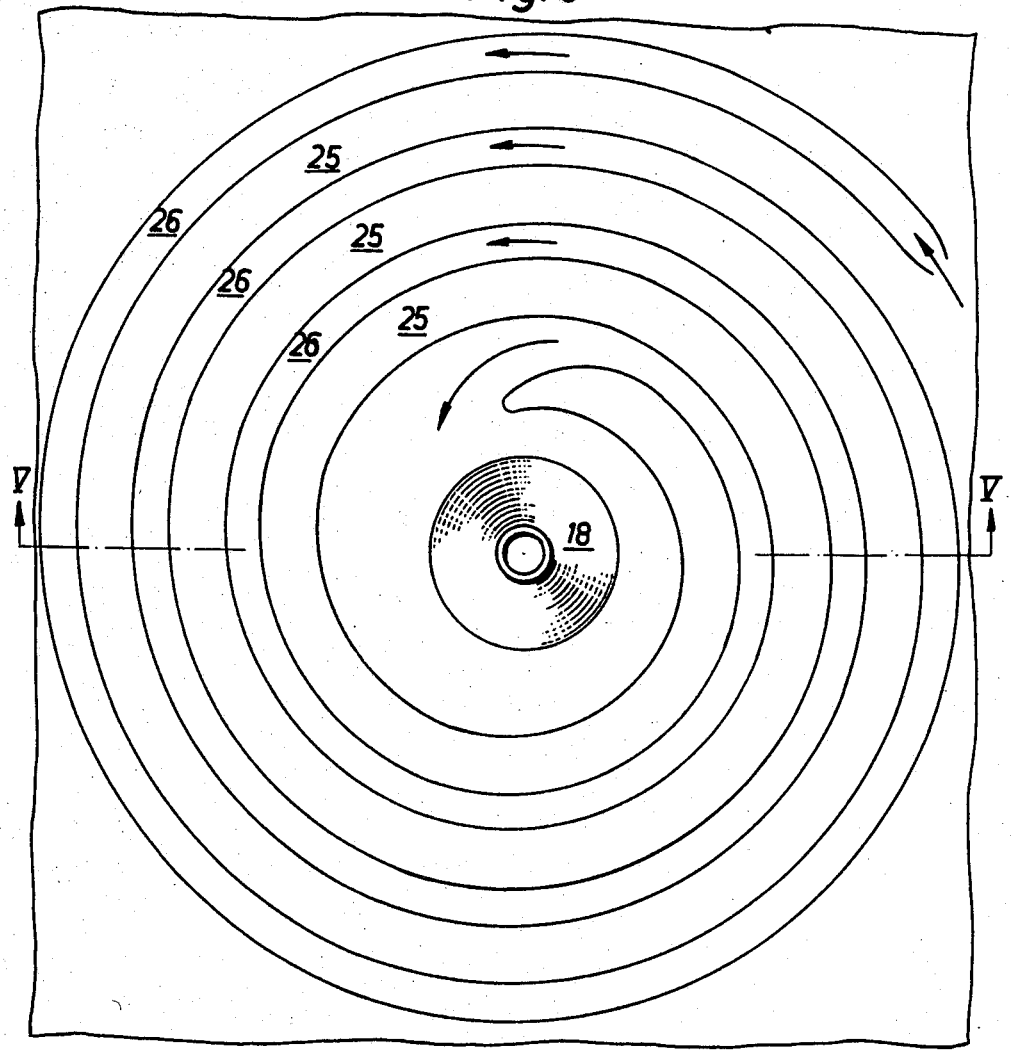

As will be seen from FIG. 4, as well as FIG. 6, the bottom ribs 25, applied in accordance with the invention, are disposed in a particular configuration. which has a surprising and highly advantageous effect on the movement of the particles and contaminants sinking to the bottom of the tank to form sludge. In the embodiment illustrated in FIGS. 4–6 a single rib is formed, instead of several ribs, this rib having been laid in a spiral around the centre of the tank, to extend a plurality of turns, in this case about three complete turns. The sludge particles sinking towards the bottom will thus collect in the depressions between the rib turns, and obviously will thus be urged by the rib configuration towards the centre. It should be noted here that this takes place many times more quickly than if the particles were to accompany the slow flow of water about the centre of the tank, and they would take several tens of turns before they reached the conical sludge funnel 18 at the centre of the tank. As it is they now reach the same place after merely about three turns.

The implementation of the bottom of the tank in accordance with the invention is thus of decisive importance, and for further clarifying this the bottom itself with its spiral rib is illustrated to an enlarged scale in FIGS. 5 and 6. The "ordinary" paths taken by both sludge and water particles about the centre of the tank are also spiral, but here it is a question of a spiral with a very small gradient and involving a very slow movement towards the centre. In its direction the spiral bottom rib will cut everywhere the almost circular paths followed by the sludge and water particles, with the result that the heavier dirt particles that sink down into the depressions between the rib turns will be guided by it and be urged considerably quicker towards the centre. This is because the particles are subjected to a driving tangential force the whole time, but due to the spiral rib introduced in the bottom their movement will be re-directed. The particles arriving at the conical sludge funnel at the centre of the circulatory course may be removed from the funnel in different ways. A simple alternative is illustrated schematically in FIG. 7, where a funnel 30 with overflow 35 is disposed substantially as already described. At a point situated low on the funnel there is a smaller tapping-off pipe 32, and since the sludge is now quickly and effectively taken to the funnel and concentrated there, the sludge may be removed together with a very small amount of water. In actual fact, only about 10% of the total amount of water passing through the overflow pipe 35 passes out in this way.

Similarly schematically, there is illustrated in FIG. 8 another alternative for removing the sludge, which is not subjected to any special concentration in the sludge funnel 40, but is directly and continuously taken off together with the departing water. There is an overflow pipe 45 as before, but it is now surrounded by an outer tubular sleeve 46, which opens out at a somewhat higher level than the overflow pipe, while the sleeve downwardly terminates shortly before the wall of the funnel 40 to form with the wall a narrow gap. In this case the sludge is not concentrated, but continuously accompanies the departing water, which will maintain a substantially constant, low content of contaminants, which may be readily removed by suitable filtering and cleaning measures.

It has been assumed in the embodiments described above that a single cohesive guide rib is arranged in the bottom of the tank, where the rib extends spirally from the outside and inwards at a gradient adjusted so that there are three turns to the spiral. In FIG. 9 there is schematically shown how four spiral ribs 50,52,54,56 may be arranged mutually spaced but of similar configuration such that the system of guide ribs is given four inputs or starts. In this case a dirt particle sinking in the outer portion of the bottom is caused to move towards the central area containing the funnel 60, while merely passing along approximately one turn.

In this manner the bottom rib system may be given optimum configuration all according to operational conditions such as water circulation rate, nature of dirt and contamination particles and their mass etc.

Apart from what has just been pointed out regarding the possibilities of varying the invention, it is emphasised that neither is it restricted to the described integral embodiment, i.e. with the guide ribs made directly in the bottom of the tank. It is indeed true that the described reinforcement and increased stiffness of the tank which is obtained by a "corrugation" of the bottom represented by the ribs are extremely valuable and constitute an unsought-for combination with a reinforcing and function-improving action. It is emphasized, however, that the nub of the invention resides in the stated proposal that in an extremely simple way and with simple means to facilitate the solution of the problem present in all fish cultivation of controlling and removing the contaminants and waste products formed, namely by creating, so to speak, a short cut for these products in their movement towards an outlet, so that they do not accompany the slowly circulating water and accumulate in it. Instead, they are urged, as soon as they have sunk to the bottom, to enter into a tighter path under the action of the circulating water, which leads to the centrally situated outlet. It is thus quite conceivable that the elasticity problems of the tank may be solved by other, perhaps separate, means, where the tank may consist of a cheap, flat-bottomed vessel, while the sludge-controlling arrangement according to the invention takes the form of a separate means placed on the bottom of the tank. Many design possibilities are here afforded to one skilled in the art, and it is once again pointed out that the invention is not restricted to the illustrated and described embodiment, and that there are many practical possibilities of working the invention.

I claim:

1. Arrangement in tanks or vessels for cultivating living fish, and comprising open tanks with a peripherally disposed inlet and centrally disposed outlet for water, which is given a circulatory movement in the tank while simultaneously approaching the outlet or outlets in a circulatory movement with the individual particles of water following a spiral path of small gradient, characterised in that along the bottom of the tank

(20) there are arranged one or more spiral grooves or furrows (26), separated by similarly spiral ribs or ridges (25), the spiral grooves having the same direction for their gradient as spiral paths of the flowing water particles but with a considerably greater gradient than these paths, such that particles of sludge or dirt sinking into the grooves (26) are urged or guided by the sides of the grooves and the action of the flowing water towards the centre of the tank (20) at a greater radial rate than that of the water particles, the groove (26) or grooves close to the centre opening out into, or merging with, a sludge-collecting means, e.g. a depression or funnel (18;30;40) at the bottom of the tank.

2. Arrangement as claimed in claim 1, where the tank outlet has the form of an over flow pipe (35;45) placed centrally in the sludge-collecting depression or funnel (30;40) at the bottom of the tank, characterised in that the sludge is arranged for removal from the funnel (30;40) by being tapped off from a level situated low down on the funnel.

3. Arrangement as claimed in claim 2, characterised by an extra outlet (32) departing from a point situated low down on the funnel (30) for tapping off the sludge and a minor portion of the water.

4. Arrangement as claimed in claim 2, characterised by there being a tubular sleeve (46) coaxially surrounding the overflow pipe (45) such as to form an annular outlet channel together with the pipe (45), departing from a level situated low down on the sludge funnel (40) for common discharge of water and sludge.

5. Arrangement as claimed in claim 1, characterised in that said grooves (26) are formed in the bottom of the tank (20) itself, said bottom thus having a "corrugated" configuration with a heavily reinforcing effect, which facilitates mounting and installing the tank without risking elastic deformation in it.

6. Arrangement as claimed in claim 1, characterised in that the grooves are formed in one or more separate means made from plastics, for example, which are placed on the bottom of the tank.

* * * * *